United States Patent
Herling et al.

(10) Patent No.: US 9,412,188 B2
(45) Date of Patent: Aug. 9, 2016

(54) METHOD AND IMAGE PROCESSING SYSTEM FOR REMOVING A VISUAL OBJECT FROM AN IMAGE

(75) Inventors: Jan Herling, Ilmenau (DE); Wolfgang Broll, Erfurt (DE)

(73) Assignee: FAYTEQ AG (DE)

( * ) Notice: Subject to any disclaimer, the term of this patent is extended or adjusted under 35 U.S.C. 154(b) by 0 days.

(21) Appl. No.: 14/426,270

(22) PCT Filed: Sep. 5, 2012

(86) PCT No.: PCT/EP2012/067352
§ 371 (c)(1),
(2), (4) Date: Mar. 5, 2015

(87) PCT Pub. No.: WO2014/037039
PCT Pub. Date: Mar. 13, 2014

(65) Prior Publication Data
US 2015/0213636 A1    Jul. 30, 2015

(51) Int. Cl.
*G06T 11/60*    (2006.01)
*G06K 9/74*    (2006.01)
(Continued)

(52) U.S. Cl.
CPC .............. *G06T 11/60* (2013.01); *G06K 9/6215* (2013.01); *G06K 9/74* (2013.01); *G06T 5/005* (2013.01)

(58) Field of Classification Search
CPC .................... G06T 11/60; G06T 5/001; G06T 2207/20192; G06T 2207/20144; G06T 2207/20021; G06T 5/005; G06T 15/503; G06T 7/0081; G06K 9/6215; G06K 9/74; G06K 9/3266; G06K 9/00664; G06K 9/46; G06K 9/6253; G06K 9/325; G06K 9/4609; G06K 9/4642; H04N 1/622; H04N 1/62; G06F 17/30256
See application file for complete search history.

(56) References Cited

U.S. PATENT DOCUMENTS

| | | |
|---|---|---|
| 2005/0146539 A1 | 7/2005 | Zhu et al. |
| 2006/0285762 A1 | 12/2006 | Sun et al. |
| 2009/0016636 A1* | 1/2009 | Kasashima ............... B60R 1/00 382/274 |

FOREIGN PATENT DOCUMENTS

EP    2 317 470 A1    5/2011

OTHER PUBLICATIONS

Advanced self-contained object removal for realizing real-time Diminished Reality in unconstrained environments Herling, J.; Broll, Wolfgang Mixed and Augmented Reality (ISMAR), 2010 9th IEEE International Symposium on Year: 2010 pp. 207-212.*

(Continued)

*Primary Examiner* — Kim Vu
*Assistant Examiner* — Michael Vanchy, Jr.
(74) *Attorney, Agent, or Firm* — Karin L. Williams; Mayer & Williams PC

(57) ABSTRACT

A method and image processing system for removing a visual object from an image, e.g., a moving image, is described. An image is provided in which a visual object to be removed is selected, for which a mask is determined. Pixels outside the mask that are intended to be used for replacing pixels inside the mask are selected, based on a similarity measure, comprising an appearance similarity measure representing the visual similarity between a previously selected pixel for replacing the pixel to be replaced and the pixel to be selected, and a geometry similarity measure, representing the closeness of the pixel to be selected to the pixel among the pixels outside the mask that was previously used for replacing the pixel adjacent to the pixel to be replaced. The pixels inside the mask are replaced by copying the properties of the selected pixels to the respective pixels to be replaced.

20 Claims, 1 Drawing Sheet

(51) Int. Cl.
*G06K 9/62* (2006.01)
*G06T 5/00* (2006.01)

(56) References Cited

OTHER PUBLICATIONS

Region filling and object removal by exemplar-based image inpainting Criminisi, Antonio; Perez, P.; Toyama, K. Image Processing, IEEE Transactions on Year: 2004, vol. 13, Issue: 9 pp. 1200-1212.*
Advanced self-contained object removal for realizing real-time Diminished Reality in unconstrained environments Herling, J.; Broll, Wolfgang, Mixed and Augmented Reality (ISMAR), 2010 9th IEEE International Symposium on Year: 2010 pp. 207-212.*
J. Herling and W.Broll: "Advanced self-contained object removal for realizing real-time diminished reality in unconstrained environments" in Mixed and Augmented Reality (ISMAR), 2010 9th IEEE International Symposium on, pp. 207-212, Oct. 2010 (6 pages total).
L. Demanet, B. Song and T. Chan.: "Image inpainting by correspondence maps: a deterministic approach" in Computer, 1100(03-40): 21750, 2003 (8 pages total).
A. Criminisi, P. Perez and K. Toyama: "Region filling and object removal by exemplar-based image inpainting" in IEEE Transactions on Image Processing, 13(9): 1200-1212, Sep. 2004 (13 pages total).
Levin et al., "Learning how to inpaint from global image statistics", Proceedings of the Eight IEEE International Conference on Computer Vision. (ICCV). Nice, France, Oct. 13-16, 2003 (8 pages total).
International Search Report issued in connection with corresponding International Application No. PCT/EP2012/067352 mailed Jun. 11, 2013 (3 pages total).

* cited by examiner

METHOD AND IMAGE PROCESSING SYSTEM FOR REMOVING A VISUAL OBJECT FROM AN IMAGE

FIELD OF THE INVENTION

The present invention concerns a method for the removal of a visual object from an image, such as a moving picture, which is being received in the form of a video data stream. The invention furthermore concerns an image processing system to carry out the method of the invention.

BACKGROUND OF THE INVENTION

From the scientific article of J. Herling and W. Broll: "Advanced self-contained object removal for realizing real-time diminished reality in unconstrained environments" in Mixed and Augmented Reality (ISMAR), 2010 9th IEEE International Symposium on, pages 207-212, October 2010, a method is known for the removal of a visual object from a video data stream, which preferably runs in real time. The method makes it possible for a user to mark a visual object, after which it is removed from the image. The region of the removed object is filled in with image content, which is supposed to come as close as possible to the image content behind the removed object. For the replacement of the image contents, regions of the image are selected outside the removed region, while an increased expense is required for the visual adaptation when the regions used for the replacement are placed alongside each other, especially at the transitions between them. The criterion used for selection of the regions used for the replacement is a measure describing the visual similarity between the selected region and the replaced region. Another criterion is a measure of the distance between the mentioned regions.

Other methods are known from the prior art which are used to remove visual objects from an image and replace them accordingly. The regions used for the replacement are selected by means of their visual similarity to the regions being replaced, as is known for example from the scientific article of L. Demanet, B. Song and T. Chan.: "Image inpainting by correspondence maps: a deterministic approach" in Computer, 1100(03-40):21750, 2003 and the scientific article of A. Criminisi, P. Perez and K. Toyama: "Region filling and object removal by exemplar-based image inpainting" in Image Processing, IEEE Transactions on, 13 (9): 1200-1212, September 2004.

SUMMARY OF THE INVENTION

The problem solved by the present invention starts from the prior art and consists in improving and making faster the selection of picture elements for the replacement of visual objects being removed.

This problem is solved by a method according to the enclosed claim 1 and by an image processing system according to the enclosed subordinate claim 14.

The method according to the invention is used for the removal of a visual object from an image, which can be a single image or a sequence of images, such as a moving picture. The visual object can be the visual representation of a natural or artificial object, which is shown in the image or the image sequence. The visual object can also be a particular image region, such as a black bar around the margin of the image. Essentially, the represented object can be static or it can change or move over the course of time. For example, the object can be formed by a person, an object, or the like. The removal of the visual object can in one simple instance be done with the goal of making the object disappear entirely from the image or the sequence of images. But the removal of the visual object can also be done with the goal of making the visual object disappear at a particular spatial position from the image or the sequence of images and then be inserted again at another spatial position in the image or the sequence of images, possibly after being scaled, rotated and/or transformed in perspective. This results in a spatial shifting of the visual object in the image or the sequence of images. Two or more visual objects can also be removed and put back in the spatial position of the other respective visual object, which results in an interchanging of the visual objects. Consequently, the removal of one or more visual objects according to the invention can be done with the goal of putting the object or objects back after a possible scaling, rotation and/or perspective transformation, which ultimately results in a rearrangement of the image. Another possible goal is to remove visual objects in the form of black bars at the margin of the image or the sequence of images, i.e., to fill them with other image content, in order to undertake a format conversion, such as one from 4:3 to 16:9.

In one step of the method according to the invention, an image is provided which has pixels in at least two dimensions. Thus, it can be a conventional two-dimensional image or also a three-dimensional pixel sequence or the like. The pixels are preferably arranged like a matrix, although other forms of arrangement are also possible. In a further step of the method of the invention, a visual object to be removed is selected in the image. This selection can occur, for example, interactively through a user. Next, a mask is to be determined for the selected visual object. The mask defines which of the pixels of the image are to be removed and replaced and which of the pixels of the image belong to the unchanging background or other unchanging parts of the image. The mask can be given, for example, in that each of the pixels of the image is coordinated with another value for its transparency. Preferably, the mask is determined automatically, appropriately adapting the selection done by the user. In a further step of the method of the invention pixels are selected outside the mask, which are to be used to replace pixels inside the mask. Essentially, the pixels outside the mask can be given in the provided image or in another image. The selection of the pixels is done by means of a similarity measure, which generally describes the similarity between the pixel being selected and a previously selected pixel to replace the pixel being replaced. According to the invention, the similarity measure comprises several components. A first component is formed by an appearance similarity measure, which represents the visual similarity between a previously selected pixel for replacement of the pixel being replaced and the pixel being selected. The appearance similarity measure can be determined, for example, on the basis of luminance, color or texture values of the pixels. The previously selected pixel for replacement of the pixel being replaced can be, for example, an initially selected pixel or a pixel which was already selected in a preceding iteration step. The previously selected pixel can also be a pixel which was used in an image in the past to replace the pixel located in the same position as the pixel being replaced. The appearance similarity measure besides the visual similarity in terms of the pixel being replaced can also represent other visual similarities, such as the visual similarities in relation to certain pixels neighboring the pixel being replaced. According to the invention, the similarity measure furthermore comprises a geometry similarity measure. The geometry similarity measure represents the local or spatial proximity of the pixel being selected to that of the pixels outside the mask that was used previously to replace the pixel neighboring the pixel being replaced. Thus, the geometry similarity measure also refers to a previously selected pixel which in turn can be initially specified or selected in a preceding iteration step. The neighboring pixel of the pixel being replaced can be a pixel which is directly or indirectly neighboring the pixel being replaced. The geometry similarity measure can also additionally represent the proximity of the pixel being selected to other pixels which were previously used to replace other pixels neighboring the pixel being replaced. The geometry similarity measure depends exclusively on the geometrical arrangement of the pixels. Visual properties of the pixels, such as color and texture, do not influence the geometry similarity measure. The geometry similarity measure is high when the pixel being selected is situated in an identical or similar geometrical arrangement in regard to the one or more pixels that were already selected to replace pixels in the neighborhood of the pixel being replaced, to that of the pixel being replaced in regard to these neighboring replaced pixels. The similarity measure as well as also the individual appearance similarity measure and the geometry similarity measure can also be framed and used according to the invention in the manner of a cost function, which is minimal when the similarities are high. In a further step of the method according to the invention, there is a replacement of the pixels inside the mask by copying the properties of the selected pixels onto the respective pixels being replaced, whereupon the replaced pixels become visually identical to the selected pixels.

A special benefit of the method according to the invention is that it can be carried out at low expense due to the copying of individual pixels, since no pixel regions have to be adapted to each other. This is possible because the spatial relationships of the pixels are factored in by the geometry similarity measure. Contrary to the prior art, besides the visual similarity of the points used for the replacement, according to the invention the similarity of the geometrical arrangement is also considered.

In preferred embodiments of the method according to the invention the selection of pixels occurs outside the mask in the provided image. In special embodiments, the selection of pixels occurs outside the mask alternatively or additionally in comparison images, which for example are provided in addition or are formed by prior or subsequent images of a sequence of moving pictures.

In preferred embodiments of the method according to the invention the selection of pixels and the replacement of the pixels is an iterative process. For this, first of all a resolution pyramid is calculated for the image, which comprises several resolution levels starting with a coarsest resolution level and ranging to a finest resolution level. The steps of the selection of pixels and the replacement of the pixels are carried out for each of the resolution levels, starting with the coarsest resolution level and going to the finest resolution level. This running through the resolution levels can be used to improve the iterative selection, and this improvement can be confined to selected regions inside the mask, in order to limit the expense of this. The previously selected pixels to be used for the determination of the appearance similarity measure and the geometry similarity measure are formed for the resolution levels, after the coarsest resolution level, by those pixels which have already been replaced in the next coarser resolution level in the position of the pixel being replaced. The iterative run of the method of the invention making use of the resolution pyramid leads to very good visual results in the replacement of the image content in the region of the removed visual object.

Basically, all pixels outside the mask can be considered for the replacement of the pixels inside the mask, for which purpose one can determine the similarity measure for all points outside the mask. Preferably, the similarity measure is determined only for a portion of the pixels outside the mask, so that the number of pixels being considered for the replacement is limited. Accordingly, the similarity measure is determined for the pixels located within at least one search region outside the mask for the selection of the pixels used for the replacement. The search region is preferably formed by a region around those pixels outside the mask which was selected for replacement of the previously replaced pixel. For example, the previously replaced pixel can be the pixel that was replaced at the position of the pixel being replaced in the next coarser resolution level.

The similarity measure furthermore preferably comprises a shape similarity measure, which represents the similarity of the pixel being selected to a shape bordering on the mask in the image. Thus, the shape similarity measure describes how suitable the pixel being selected is to continue a shape present in the image in the region of the object being removed. This should make sure that shapes which are located behind the object being removed are continued by the replacement of the pixels.

The shape to consider for the shape similarity measure can be formed by a straight or curved edge, for example. But the shape can also be formed by a regularly arranged and repeating straight or curved edge. The shape similarity measure is a maximum when the pixel being replaced inside the mask by a replacement with the pixel being selected forms a continuation of the edge situated outside the mask. Like the other similarity measures mentioned, the shape similarity measure can also be framed and used as a cost function, which is a minimum when the existing shape is ideally continued.

The mask is preferably binary, so that a pixel is assigned either to the object being removed or to the background. Consequently, the value for the transparency is either zero or one. In special embodiments of the method according to the invention, the pixels can also be weighted and assigned to the object being removed and the background. Such masks are also known as gray-scaled.

The appearance similarity measure is based preferably on differences in color values, luminance values, texturizing values and/or the gradients of these values of the previously selected pixel and the pixel being selected. The differences to be ascertained for the appearance similarity measure are preferably formed by differences and/or distance measures of the respective values.

The geometry similarity measure is preferably a maximum when the pixel being selected is arranged in identical fashion with respect to the pixel used for the replacement of the pixel neighboring the pixel being replaced as is the pixel being replaced with respect to the pixel neighboring the pixel being replaced.

The similarity measure is preferably formed by a weighted sum of the appearance similarity measure and the geometry similarity measure and optionally the shape similarity measure. The weighting of the individual similarity measures can be changed to enable an adapting to particular image contents and particular visual objects being removed.

In preferred embodiments of the method according to the invention, when determining the similarity measure to decide on the selection of the pixel to be selected, not only is the similarity measure determined solely in relation to the pixel being selected but also pixels are taken into account that are directly or indirectly neighboring the pixel being selected. For this, the similarity measure used for the selection of one of the pixels being selected is formed by a sum of similarity measures, which comprises not only the similarity measure with respect to the pixel being selected but also the similarity measures with respect to several of the pixels directly or indirectly neighboring the pixel being selected. This applies individually to the appearance similarity measure, the geometry similarity measure and optionally the shape similarity measure. Preferably, the similarity measure used for the selection of one of the pixels being selected also comprises the similarity measures with respect to the pixels arranged in an evaluation neighborhood around the pixel being selected. This applies individually to the appearance similarity measure, the geometry similarity measure and optionally the shape similarity measure.

The evaluation neighborhood is preferably formed by a quadratic matrix of pixels having a length between 2 and 10 pixels, especially preferably a length between 4 and 6 pixels.

In the mentioned preferred embodiments, a sum of appearance similarity measures is to be determined. A single one of these appearance similarity measures with respect to a pixel neighboring the pixel being selected is preferably determined with respect to a previously selected pixel for the replacement of a pixel neighboring the pixel being replaced in identical fashion. Accordingly, a single one of the geometry similarity measures with respect to a pixel neighboring the pixel being selected represents the local or spatial proximity of the pixel neighboring the pixel being selected to that one of the pixels outside the mask that was used previously for the replacement of the pixel neighboring the pixel being replaced in identical fashion.

The sums of the individual similarity measures are preferably formed each time by a sum of the respective similarity measures weighted with weighting factors. Thus, the sum of the appearance similarity measures is preferably formed by a sum of the appearance similarity measures weighted with weighting factors. Correspondingly, the sum of the geometry similarity measures is preferably formed by a sum of the geometry similarity measures weighted with weighting factors. Furthermore, correspondingly, the sum of the shape similarity measures is preferably formed by a sum of the shape similarity measures weighted with weighting factors. The mentioned weighting factors can be adapted to the particular content of the image or also to the particular visual object being removed.

The weighting factors are preferably dependent each time on a distance of the pixel directly or indirectly neighboring the pixel being selected from the pixel being selected. In addition or alternatively, the weighting factors are dependent each time on a direction of the pixel directly or indirectly neighboring the pixel being selected with respect to the pixel being selected. In addition or alternatively, the weighting factors are preferably dependent each time on a distance of the pixel being selected from a middle of the image.

The selection of the visual object to be removed in the image provided is done preferably in that a user marks the visual object to be removed on an interactive display. The interactive display can be formed, for example, by a touch-sensitive display, but also by a computer monitor with corresponding mouse. The marking of the visual object to be removed on the interactive display is done preferably in that the user symbolically draws a circle around the visual object to be removed. The circle need not be a geometrical circle, but rather can be adapted for example to the external shape of the visual object. The circle already represents a preliminary stage of the mask. From this preliminary stage the mask is then determined, for which the preliminary stage is reduced and/or enlarged, especially by image regions at the margin.

In preferred embodiments of the method according to the invention, the visual similarity of the pixels inside the circle is determined in order to determine the mask.

In especially preferred embodiments of the method according to the invention this is furthermore designed to remove the visual object being removed from a video data stream. In these embodiments, first of all there is a reception of a transmitted video data stream, for example, a live broadcast video data stream. The video data stream comprises a current image and following images. Each of the images has pixels in at least two dimensions. A first image is provided by the received current image. First of all, the steps according to the invention are carried out for selection of the visual object to be removed, determination of a mask, selection of pixels and replacement of the pixels for the current image. Next, a following image of the transmitted video data stream is received, which constitutes a further image provided. After this, the steps of the invention are repeated for the determination of a mask, the selection of pixels and the replacement of the pixels for the additional image received, while the pixels replaced in the preceding image serve as the previously selected pixels. The pixels replaced in the preceding image can be used for example as the previously selected pixels in the coarsest resolution level of the resolution pyramid used. The pixels replaced in the preceding image can be those of the replaced pixels that were used in the previous image at the same positions for the replacement as the pixels being replaced in the additional image received. However, they can also be those of the replaced pixels that were used for the replacement in the preceding image in different positions than the pixels being replaced in the additional image received; for example, if these pixels used for the replacement in different positions are estimated as being better suited to the replacement of the particular pixels in the additional image received.

In embodiments of the method according to the invention in which the visual object to be removed is removed from a video data stream, the similarity measure preferably further comprises a continuity similarity measure, which represents the visual similarity between the pixel being selected and the pixel which was used for the replacement of a pixel located in an identical spatial position as the pixel being replaced in an earlier or later image. The earlier or later image can be formed, for example, by a predetermined key frame.

The continuity similarity measure like the other individual similarity measures is also determined preferably for pixels which are directly or indirectly neighboring the pixel being selected. For this, the continuity similarity measure is preferably formed by a sum of continuity similarity measures comprising, besides the continuity similarity measure with respect to the pixel being selected, also the continuity similarity measures with respect to several pixels directly or indirectly neighboring the pixel being selected. The individual continuity similarity measures are preferably weighted and formed into a sum, like the other individual similarity measures.

The similarity measure is preferably formed by a weighted sum of the appearance similarity measure, the geometry similarity measure and optionally the shape similarity measure as well as the continuity similarity measure. The weighting of the individual similarity measures can be changed to enable an adaptation to particular image contents and particular visual objects being removed.

In embodiments of the method according to the invention in which the visual object to be removed is removed from a video data stream, the determination of the mask for one of the images is done preferably based on the mask determined for the preceding image. This ensures a temporal continuity of the masks.

The method according to the invention is preferably carried out in real time, for example, in order to remove a visual object in a live broadcast video data stream and display the video data stream with the replaced pixels. For example, the visual object can be removed from a video data stream which is produced directly by a video camera.

The method according to the invention is preferably implemented as a computer program.

The image processing system according to the invention designed to carry out the method according to the invention. Preferably, the image processing system is designed for preferred embodiments of the method according to the invention.

The image processing system according to the invention can be formed by the most diverse of data processing systems, such as a computer, a tablet computer or a smartphone.

BRIEF DESCRIPTION OF THE DRAWINGS

Further details and modifications of the invention will appear from the following description of a preferred embodiment, making reference to the drawing. There are shown.

DETAILED DESCRIPTION

Figure 1:
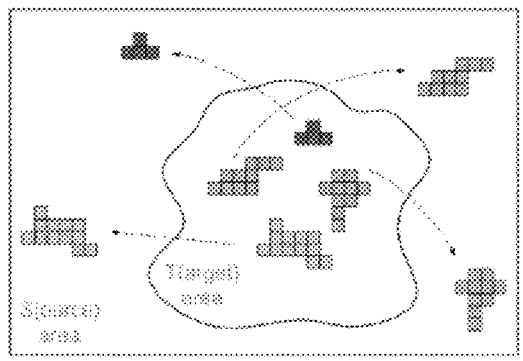
FIG. 1 is an illustration of a geometry similarity measure.
Figure 2:
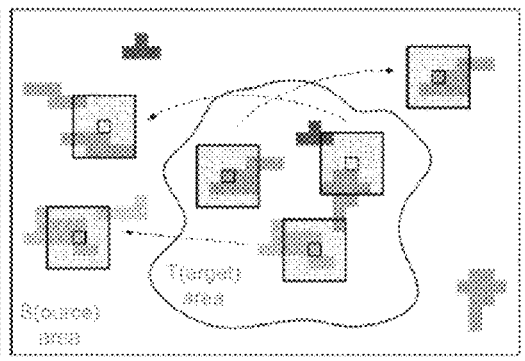
FIG. 2 is an illustration of an appearance similarity measure.

FIGS. 1 and 2 illustrate similarity measures for determining the suitability of a picture element being selected for the replacement of a picture element which was removed for the removal of a visual object from an image or a moving picture. The removal of visual objects constitutes a key task of so-called "Diminished Reality". For this, one needs to find transforms f in order to assign pixels of a target T to the pixels in a source S. The similarity in the image regions should be a maximum, which can also be expressed by saying that the cost function $cost_a$ is a minimum:

$$\min_f \sum_{p \in R \cup T} cos_a(p)$$

In this equation, $p=(p_x, p_y)^T$ stands for a 2D position. According to the invention, a geometry similarity measure and an appearance similarity measure are determined, which can also be framed correspondingly as a geometry cost function $cost_{spatial}(p)$ and an appearance cost function $cost_{appearance}(p)$. The two similarity measures or cost functions are additively weighted and combined:

$$cost_\alpha(p) = \alpha \cdot cost_{spartial}(p) + (1-\alpha) \cdot cost_{appearance}(p)$$

In this equation, a is a weighting factor, while $0 < \alpha < 1$.

As is shown by FIG. 1, the geometry cost function takes into account the arrangement of the neighboring pixels $N_s$. The geometry cost function preferably appears as:

$$cost_{spatial}(p) = \sum_{v \in N_s} d_s[f(p) + v, f(p+v)] \cdot w_s(v)$$

In this equation, $d_s$ stands for a spatial distance measure. The factor $w_s$ is a weighting factor, especially for the pixels in the surrounding neighborhood.

Furthermore, an alternative preferred geometry cost function appears as follows:

$$cost_{spatial}(p) = \min(d_s[f(p) + v, f(p+v)] \cdot w_s(v))$$

As is clear from FIG. 2, the appearance similarity measure determines the visual similarity of the pixel being selected to a pixel previously selected for the replacement, taking into account neighboring pixels $N_a$. The corresponding appearance cost function is preferably defined as follows:

$$cost_{appearance}(p) = \sum_{v \in N_a} d_a[I(p+v), I(f(p)+v)] \cdot w_{a1}(p+v) \cdot w_{a2}(v) \cdot w_{a3}(f(p)+v)$$

In this equation, $d_a$ stands for a distance measure, which is applied to the visual appearance, for example, the color. The distance measure can be formed, for example, by the sum of the squared differences (SSD) or by the sum of the absolute differences (SAD). The factors $w_{a1}$, $w_{a2}$ and $w_{a3}$ are weighting factors.

The method according to the invention is preferably applied to a video data stream. Again, preferably, a continuity similarity measure is taken in to account, which describes the coherence of the video data stream. The continuity similarity measure is defined as a continuity cost function or a coherence cost function preferably as follows:

$$cost_{coherence}(p) = \sum_{v \in N_a} d'_a[I(p+v), R(p+v)] \cdot w'_{a1}(p+v) \cdot w_{a2}(v)$$

According to this equation, the neighboring pixels $N_a$ are likewise taken into account. In this equation, $d'_a$ stands for a distance measure. R(p) is the pixel of a reference model. The factors $w'_{a1}$, and $w'_{a2}$ once again are weighting factors.

Figure 3:
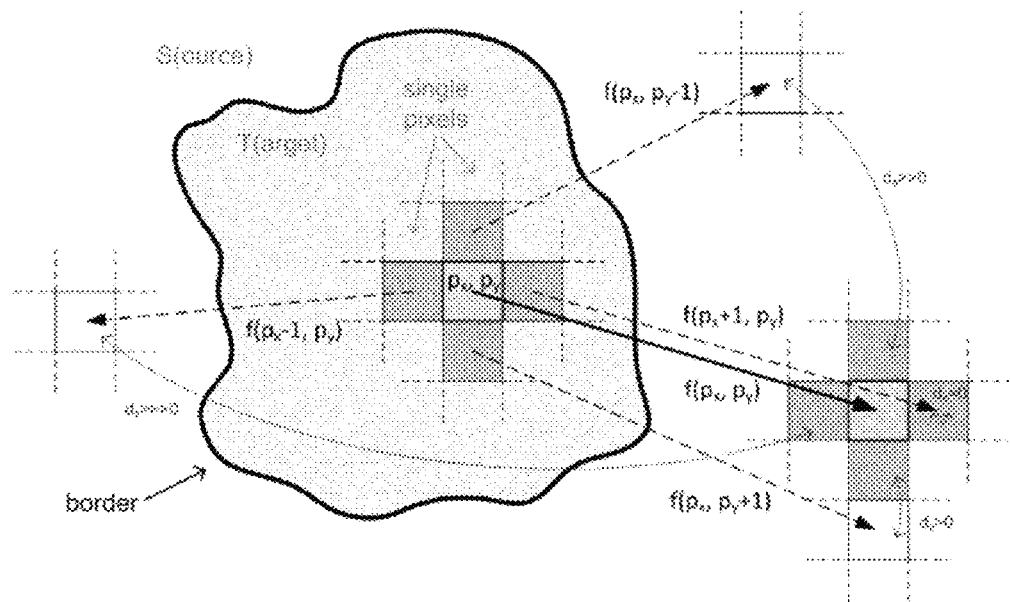
FIG. 3 is an illustration of the determination of the geometry similarity measure.

FIG. 3 illustrates the determination of the geometry cost function. The distance measure $d_s$ will be zero when the pixel being selected is arranged in the same manner to the previously selected pixels as is the case in the target region. The distance measure $d_s$ is slightly larger than zero when the geometrical arrangement is at least similar, for example, as with $f(p_x, p_{y+1})$. The distance measure $d_s$ is very much greater than zero when the pixel being selected is located in a far distant position in the image, such as with $f(p_x, p_{y-1})$ or $f(p_{x-1}, p_y)$.

The invention claimed is:

1. A method for removal of a visual object from an image, comprising the following steps:
   providing an image having pixels in at least two dimensions;
   selecting a visual object to be removed in the image;
   determining a mask for the selected visual object;
   selecting of pixels outside the mask which are to be used for the replacement of pixels inside the mask, wherein the selection of the pixels is decided by means of a similarity measure, which comprises an appearance similarity measure, representing the visual similarity between a previously selected pixel for replacement of the pixel being replaced and the pixel being selected, wherein the similarity measure furthermore comprises a geometry similarity measure, representing the proximity of the pixel outside the mask being selected for replacement of a pixel inside the mask to one of the pixels outside the mask that was previously selected for replacement of a pixel neighboring the pixel inside the mask being replaced; and replacing of the pixels inside the mask by copying the properties of the selected pixels onto the pixels being replaced.

2. The method according to claim 1, wherein the selection of pixels outside the mask is done in the image provided.

3. The method according to claim 1, wherein at first a resolution pyramid is calculated for the image, which comprises several resolution levels starting with the coarsest resolution level and ranging up to a finest resolution level, wherein the steps of the selection of pixels and replacement of pixels are carried out for each of the resolution levels starting with the coarsest resolution level and proceeding up to the finest resolution level, and wherein the pixels replaced in the next coarser resolution level are used as the previously selected pixels in the resolution levels after the coarsest resolution level.

4. The method according to claim 1, wherein the similarity measure for the pixels located within at least one search region outside the mask is determined for the selection of the pixels used for the replacement.

5. The method according to claim 4, wherein the search region is formed by a region about that one of the pixels outside the mask that was selected for the replacement of the previously selected pixel.

6. The method according to claim 1, wherein the similarity measure furthermore comprises a shape similarity measure, representing the similarity of the pixel being selected to a shape bordering on the mask in the image.

7. The method according to claim 1, wherein the similarity measure is a weighted sum of the appearance similarity measure and the geometry similarity measure or a weighted sum of the appearance similarity measure, the geometry similarity measure and the shape similarity measure.

8. The method according to claim 1, wherein the similarity measure used for the selection of one of the pixels being selected is formed by a sum of the similarity measures comprising, besides the similarity measure with respect to the pixel being selected, also the similarity measures with respect to several of the pixels neighboring the pixel being selected.

9. The method according to claim 1, wherein the selection of the visual object to be removed in the image provided is done in that a user marks the visual object to be removed on an interactive display.

10. The method according to claim 1, wherein it is furthermore designed to remove the visual object being removed from a video data stream, wherein the method comprises the following additional steps:

receiving a transmitted video data stream, which comprises a current image and following images, each of the images having pixels in at least two dimensions;

performing the steps of the selection of the visual object to be removed, the determination of a mask, the selection of pixels and the replacement of the pixels for the current image;

receiving a following image of the transmitted video data stream; and repeating the steps for the determination of a mask, the selection of pixels and the replacement of the pixels for the additional image received, wherein the pixels replaced in the previous image are used as the previously selected pixels.

11. The method according to claim 10, wherein the similarity measure further comprises a continuity similarity measure, which represents the visual similarity between the pixel being selected and the pixel which was used for the replacement of a pixel located in an identical spatial position as the pixel being replaced in an earlier or later image.

12. The method according to claim 10, wherein the determination of the mask for one of the images is done based on the mask determined for the preceding image.

13. The method according to claim 10, wherein it is carried out in real time.

14. An image processing system designed to carry out the method according to claim 1.

15. An image processing system according to claim 14, wherein it is formed by a computer, by a tablet computer or by a smartphone.

16. An image processing system designed to carry out the method according to claim 2.

17. An image processing system designed to carry out the method according to claim 3.

18. An image processing system designed to carry out the method according to claim 10.

19. An image processing designed to carry out the method according to claim 11.

20. An image processing system designed to carry out the method according to claim 12.

* * * * *